(12) United States Patent
Ozaki et al.

(10) Patent No.: US 10,232,943 B2
(45) Date of Patent: Mar. 19, 2019

(54) AIRCRAFT PASSENGER SEAT

(71) Applicant: JAMCO CORPORATION, Mitaka-shi, Tokyo (JP)

(72) Inventors: Masaji Ozaki, Mitaka (JP); Nozomu Tagami, Mitaka (JP); Sanae Ootake, Mitaka (JP)

(73) Assignee: JAMCO CORPORATION, Mitaka-shi (JP)

( * ) Notice: Subject to any disclaimer, the term of this patent is extended or adjusted under 35 U.S.C. 154(b) by 324 days.

(21) Appl. No.: 15/309,587

(22) PCT Filed: Nov. 14, 2014

(86) PCT No.: PCT/JP2014/080228
§ 371 (c)(1),
(2) Date: Nov. 8, 2016

(87) PCT Pub. No.: WO2015/170428
PCT Pub. Date: Nov. 12, 2015

(65) Prior Publication Data
US 2017/0152046 A1      Jun. 1, 2017

(30) Foreign Application Priority Data

May 9, 2014    (JP) .............................. 2014-097268

(51) Int. Cl.
*B64D 11/06* (2006.01)
*B60N 2/427* (2006.01)

(52) U.S. Cl.
CPC .......... *B64D 11/0619* (2014.12); *B60N 2/427* (2013.01); *B64D 11/06* (2013.01); *B64D 11/0696* (2013.01)

(58) Field of Classification Search
None
See application file for complete search history.

(56) References Cited

U.S. PATENT DOCUMENTS 3,578,376 A * 5/1971 Hasegawa ................ B60N 2/07
                                                            296/68.1
3,582,133 A * 6/1971 DeLavenne ............. B60N 2/10
                                                            188/268

(Continued)

FOREIGN PATENT DOCUMENTS

EP    2 706 010 A2    3/2014
JP    63-41297 A      2/1988

(Continued)

OTHER PUBLICATIONS

Extended (supplementary) European Search Report dated Jun. 28, 2017, issued in counterpart European Application No. 14891254.6 (7 pages).
International Search Report dated Feb. 10, 2015, issued in counterpart International Application No. PCT/JP2014/080228 with English Translation (5 pages).

(Continued)

*Primary Examiner* — David E Allred
(74) *Attorney, Agent, or Firm* — Westerman, Hattori, Daniels & Adrian, LLP

(57) ABSTRACT

An aircraft passenger seat (100) is fixed to a floor via a seat track fitting (110), and a reclining assembly of the seat is supported by pipes (130, 132) passed through left and right legs (120) and spreaders (170). A linear actuator (300) operates a reclining motion. A curved arm for deformation is provided to a mount (320) on which the actuator (300) is mounted, and a slit (145) is provided in a link plate (140) to which a rod is connected, and in a state where a forward force F is applied, the curved arm deforms and absorbs the impact. An impact absorbing structure is also provided to the legs (120).

5 Claims, 10 Drawing Sheets

(56) References Cited

U.S. PATENT DOCUMENTS

| | | | | |
|---|---|---|---|---|
| 4,128,217 | A | * 12/1978 | Mazelsky | B64D 25/04 |
| | | | | 188/377 |
| 4,718,719 | A | 1/1988 | Brennan | |
| 5,152,578 | A | 10/1992 | Kiguchi | |
| 8,205,833 | B2 * | 6/2012 | Kismarton | A47C 5/00 |
| | | | | 244/122 R |
| 8,393,574 | B2 * | 3/2013 | Kismarton | A47C 5/00 |
| | | | | 244/122 R |
| 2003/0011220 | A1 | 1/2003 | Drage et al. | |
| 2003/0075962 | A1 | 4/2003 | Saltzer et al. | |
| 2004/0061364 | A1 * | 4/2004 | Humer | B60N 2/4228 |
| | | | | 297/216.14 |
| 2013/0113247 | A1 * | 5/2013 | Magnus | B60N 2/1615 |
| | | | | 297/216.19 |
| 2013/0175833 | A1 * | 7/2013 | Evans | B60N 2/4228 |
| | | | | 297/216.13 |
| 2018/0229629 | A1 * | 8/2018 | Chatwin | B60N 2/42709 |

FOREIGN PATENT DOCUMENTS

| | | |
|---|---|---|
| JP | 2520005 B2 | 7/1996 |
| JP | 11-321795 A | 11/1999 |
| JP | 2003-519042 A | 6/2003 |
| JP | 4005366 B2 | 11/2007 |
| JP | 2008-545570 A | 12/2008 |
| JP | 2012-91540 A | 5/2012 |
| WO | 2006/124555 A2 | 11/2006 |

OTHER PUBLICATIONS

Written Opinion of the International Searcing Authority PCT/ISA/237 dated Feb. 10, 2015, of PCT/JP2014/080228 with English Translation (6 pages).

Office Action dated May 10, 2016, issued in counterpart of Japanese Patent Application No. 2014-097268 with English Translation (4 pages).

* cited by examiner

US 10,232,943 B2
1
AIRCRAFT PASSENGER SEAT

TECHNICAL FIELD

The present invention relates to an improvement of aircraft passenger seats.

BACKGROUND ART

The aircraft passenger seats are required to stay attached to a floor of the aircraft or not deform greatly even in a state where an acceleration of 16 times the gravity of the earth is applied when the aircraft makes a belly landing. This request can be proved through a movement load test that applies an acceleration of 16 times the gravity to the seat.

In a prior art product, the whole body of the seat is bent to absorb the impact of the test by methods such as reducing a plate thickness of the respective members, but such methods lead to the drawback of causing passengers to feel unsafe by the bending of the seat during use, or to distortion of the structural members leading to deterioration of movement of movement members.

In general, metal may easily be damaged where a force is added in a state where bend or torsion exists compared to a state where the bend or torsion exists. If the seat adopts a configuration where displacement or the load applied during the test is conducted to a plurality of components in the state of bend or torsion, the respective components must be reinforced, which leads to the increase of the weight of the whole seat.

In the aircraft seat, the required load is extremely great, but on the other hand, the weight must be reduced to suppress the operation cost of the airframe, so that unnecessary reinforcement must be avoided by preventing bend or torsion from occurring in multiple components through structural design.

CITATION LIST

Patent Literature

[PTL 1] Japanese Unexamined Patent Application Publication No. 2008-545570
[PTL 2] Japanese Unexamined Patent Application Publication No. 2012-91540

SUMMARY OF INVENTION

Technical Problem

The object of the present invention is to provide an aircraft passenger seat having an impact energy absorption performance required without increasing the weight and deteriorating the rigidness during operation, by designing the arrangement of components of the aircraft passenger seat and forming the respective members to realize an impact absorbing structure.

Solution to Problem

In order to achieve the above-described object, the aircraft passenger seat according to the present invention includes, as basic means, a pair of legs mounted via a fitting to a seat track on a floor surface of an aircraft, two pipes fixed to a front portion and a rear portion of the legs, a frame fixed to the two pipes and supporting a reclining assembly of the seat, and a linear actuator, wherein a rear portion of the actuator is supported pivotably on a mount fixed to the pipe, and a tip of a linearly-moving rod is coupled via a pin to a link plate operating the reclining assembly of the seat, and the linear actuator is arranged so that an axis line of the linear actuator passes a vicinity of a center of a rear pipe.

The mount includes a pair of curved arms having a through hole formed at a center portion of the arms, and in a state where a force in a direction extending the mount is received, the curved arms are stretched and absorbs the impact.

Further, the link plate has a groove, and in a state where the reclining assembly of the seat receives a forward force, the groove deforms so as to be widened, and absorbs the impact.

Moreover, the leg includes a bolt hole fixed to the fitting, a pipe hole through which a pipe passes, and a groove formed between the bolt hole at the rear portion and the pipe hole, so that in a state where the leg receives a forward force, the groove deforms so as to be widened, and absorbs the impact.

Next, the airport passenger seat includes a bushing fit to an area between the bolt hole of the fitting and a bolt inserted to the bolt hole, and in a state where a force in the direction bringing down the fitting is applied, the bushing deforms and absorbs the impact, and the bushing includes a taper formed to an outer circumference portion of the bushing.

Advantageous Effects of Invention

The aircraft passenger seat of the present invention having the above-described means can ensure required strength without additionally providing a member for reinforcement.

DESCRIPTION OF EMBODIMENTS

Figure 1:
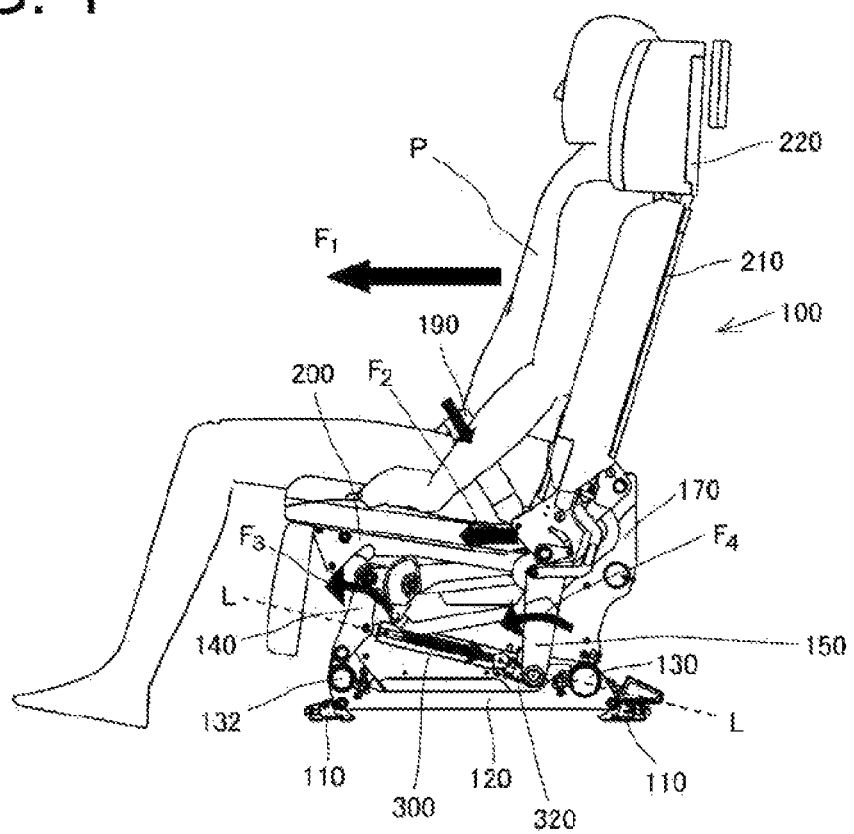
FIG. 1 is a side view illustrating a relationship of force applied to an aircraft passenger seat according to the present invention.
Figure 2:
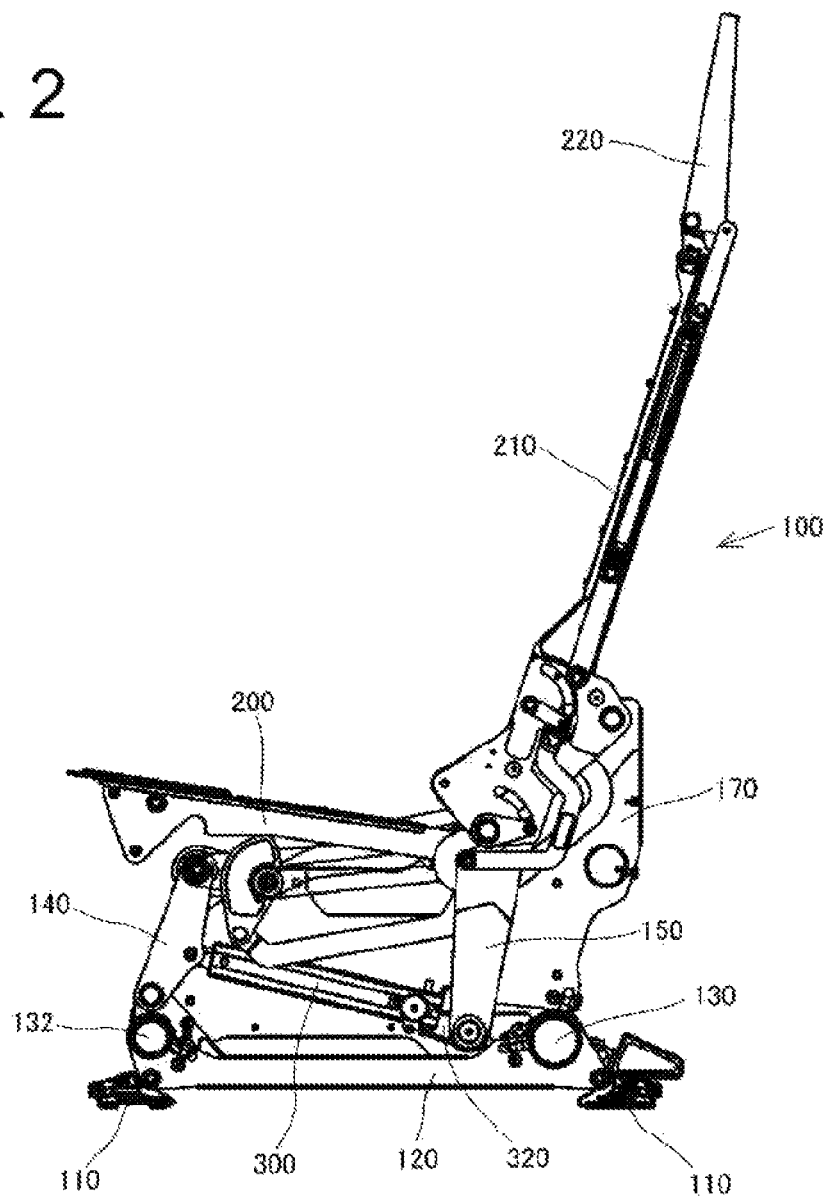
FIG. 2 is a side view of an aircraft passenger seat according to the present invention.
Figure 3:
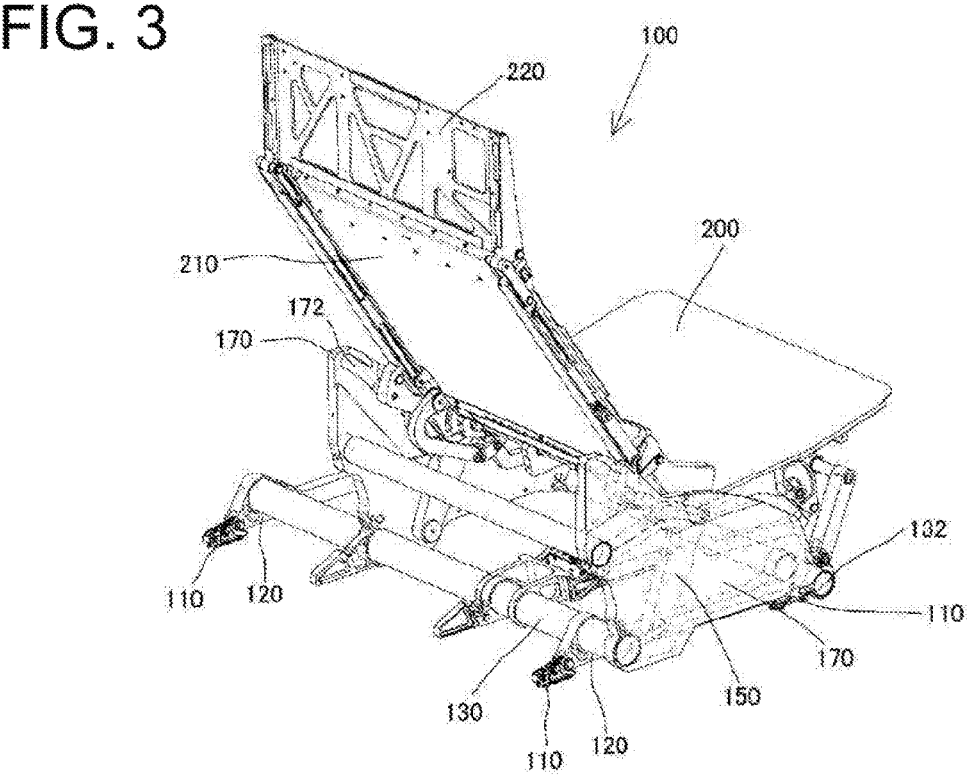
FIG. 3 is a perspective view taken from a rear direction of the aircraft passenger seat according to the present invention.

FIG. 1 is an explanatory view illustrating an outline of an aircraft passenger seat according to the present invention, FIG. 2 is a side view of main structural members of the seat, and FIG. 3 is a perspective view taken from an oblique rearward direction.

An aircraft passenger seat denoted as a whole by reference number 100 is mounted onto a floor by a seat track fitting 110 fixed to a seat track provided on the floor of the aircraft. The seat track fitting 110 disposed on front and rear sides of a passenger seat supports legs 120, and the left and right legs 120 are connected by two pipes 130 and 132.

A reclining assembly performing reclining operation in a state where a passenger P is sitting on the seat is configured, for example, of a seat bottom frame 200 on which a passenger is seated, a back rest frame 210 supporting a back of the passenger, and a head rest frame 220 supporting a head portion of the passenger. The reclining assembly is supported so that it can be reclined freely by spreaders 170, which are frame bodies arranged on both sides of the assembly.

The reclining assembly includes a roller engaged with a groove 172 formed on the spreaders 170, and performs the reclining operation. The reclining operation is driven by a linear actuator 300, by which two link plates 140 and 150 are operated.

FIG. 1 illustrates a state assuming a movement load test of the seat 100.

A passenger P is bound to the seat with a seatbelt 190, and the seat is in an upright position. The actuator 300 is in a most contracted state. A strength of each member of the passenger seat is tested of a case where an acceleration of 16 times the gravity is applied in this state to a frontward direction.

Major forces include a force $F_1$ in which the passenger P moves forward, a force $F_2$ in which a frame 140 having the reclining assembly attached is drawn forward, and forces $F_3$ and $F_4$ pivoting the link plates 140 and 150 forward.

In the aircraft passenger seat 100 of the present invention, an axis line L of the linear actuator 300 is arranged to pass a mount 320 used for mounting and a pipe 130, so that an axial force occurring in the actuator is suppressed to a minimum, and that the occurrence of a bending stress to the mount of the actuator is prevented, according to which the respective components can be subjected to weight reduction.

Figure 4:
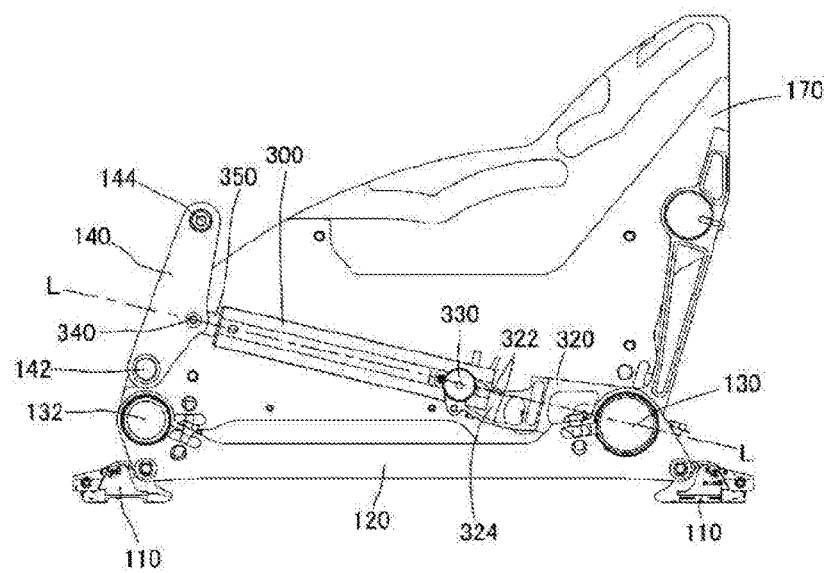
FIG. 4 is a side view of a relevant portion of the aircraft passenger seat according to the present invention.
Figure 5:
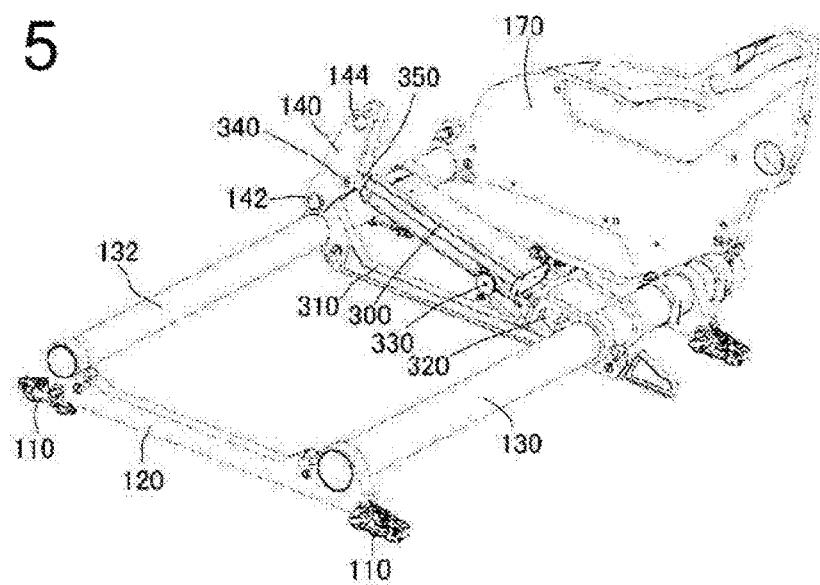
FIG. 5 is a perspective view of a relevant portion of the aircraft passenger seat according to the present invention.

FIG. 4 is a side view illustrating a mounting structure of the linear actuator 300, and FIG. 5 is a perspective view.

A rear end portion of the linear actuator 300 is mounted to a frame 310 connected to two pipes 130 and 132, and pivotably mounted via a pin 330 to the mount 320 fixed to the rear pipe 130.

The mount 320 fixed to the rear pipe 130 does not pivot, and the mount 320 has two curved arms 322 provided on the tip portion thereof.

A through-hole 324 is formed between the two curved arms 322.

The actuator 300 is equipped with a rod 350 driven linearly. A tip of the rod 350 is connected via a pin 340 to an intermediate portion of the link plate 140. The link plate 140 is connected to the frame 310 via a pin 142, and a pin 144 on the other end of the link plate 140 pivots.

Figure 6:
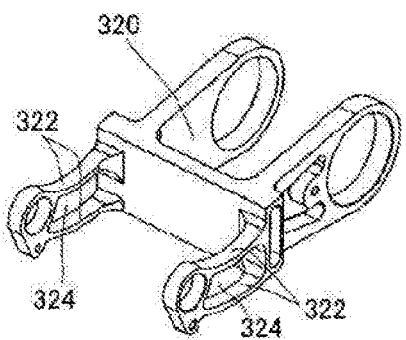
FIG. 6 is a perspective view of a member of the aircraft passenger seat according to the present invention.

FIG. 6 illustrates a detail of the mount 320.

In a case where the two curved arms 322 receive tensile stress ($F_3$ of FIG. 1), it deforms and stretches in a straightened manner.

Figure 7:
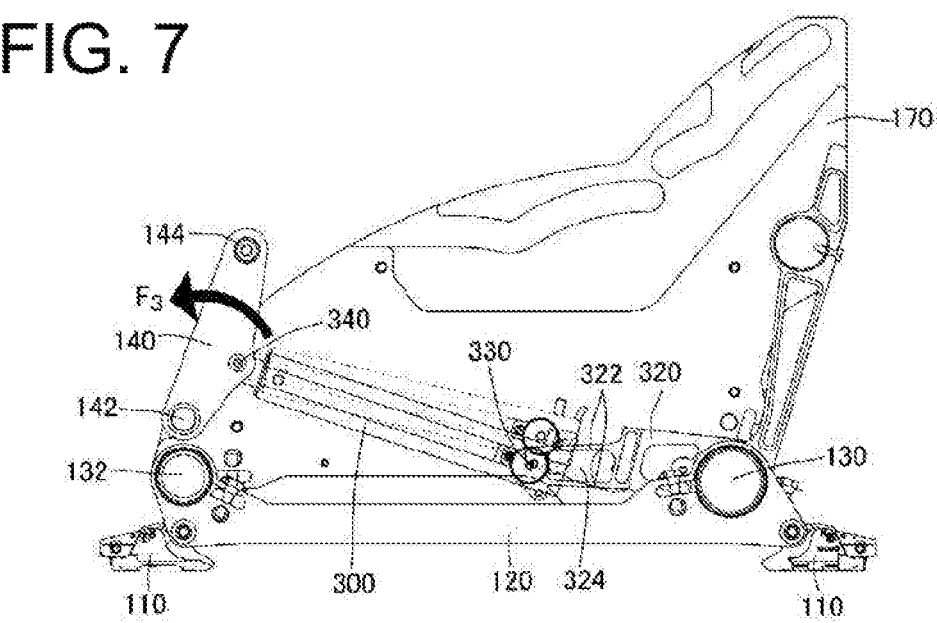
FIG. 7 is a side view of a relevant portion of the aircraft passenger seat according to the present invention.

According to this arrangement, in a case where a forward force $F_3$ is applied to the link plate 140 illustrated in FIGS. 1 and 7, the arms 322 of the mount 320 stretch and absorb the impact.

Figure 8:
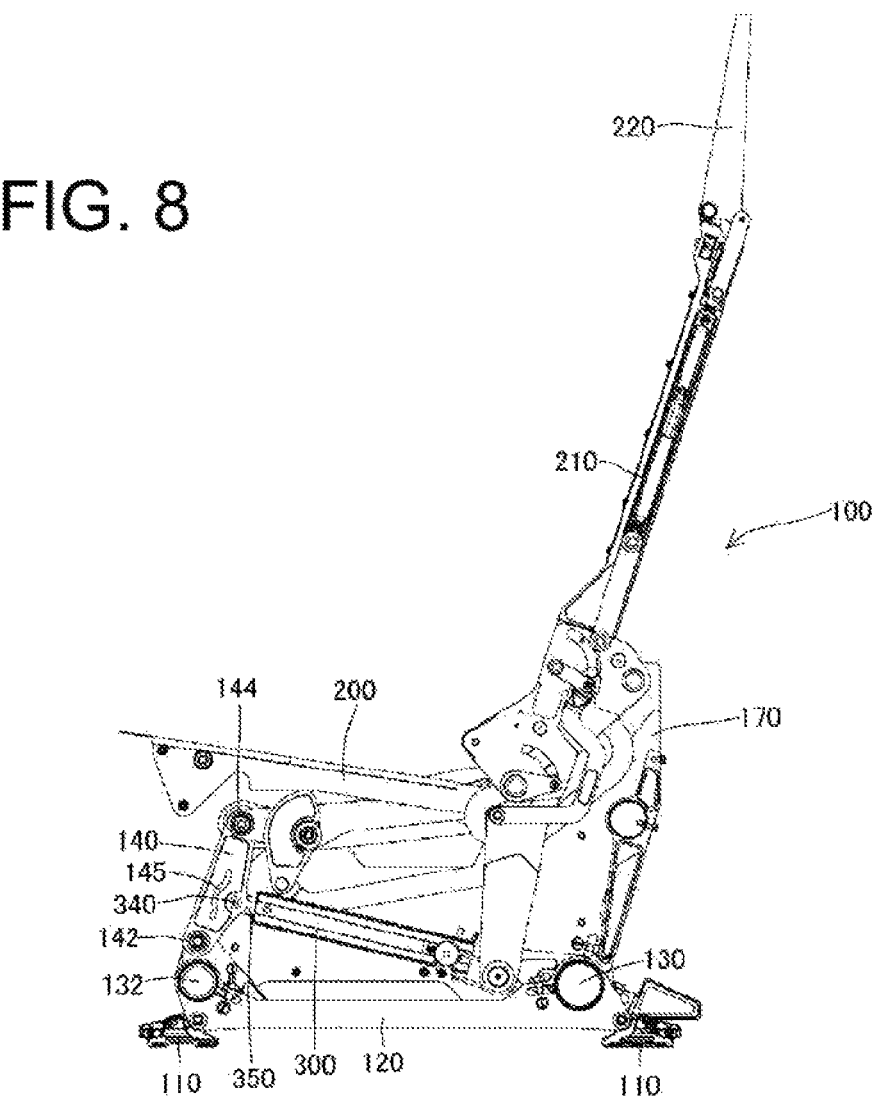
FIG. 8 is a side view of the aircraft passenger seat according to the present invention.
Figure 9:
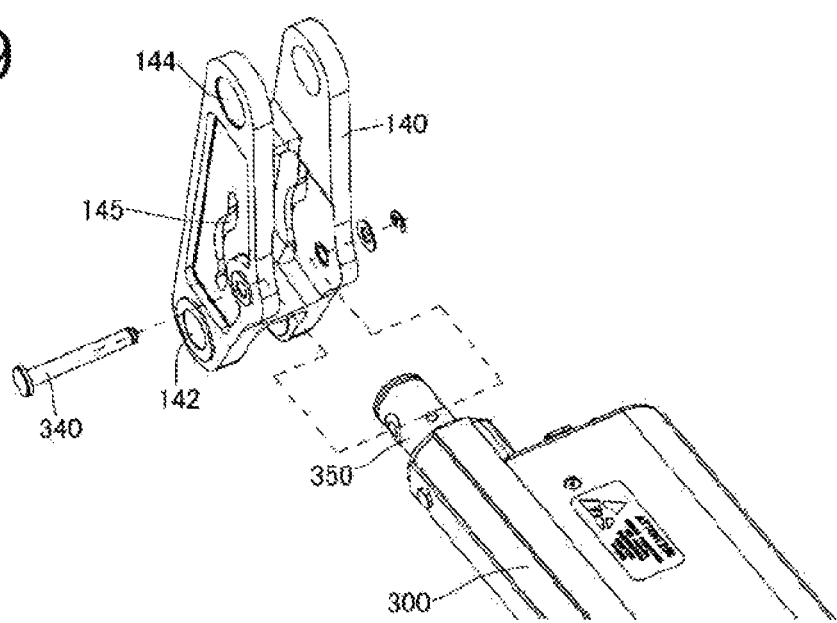
FIG. 9 is a perspective view of a member of the aircraft passenger seat according to the present invention.
Figure 10:
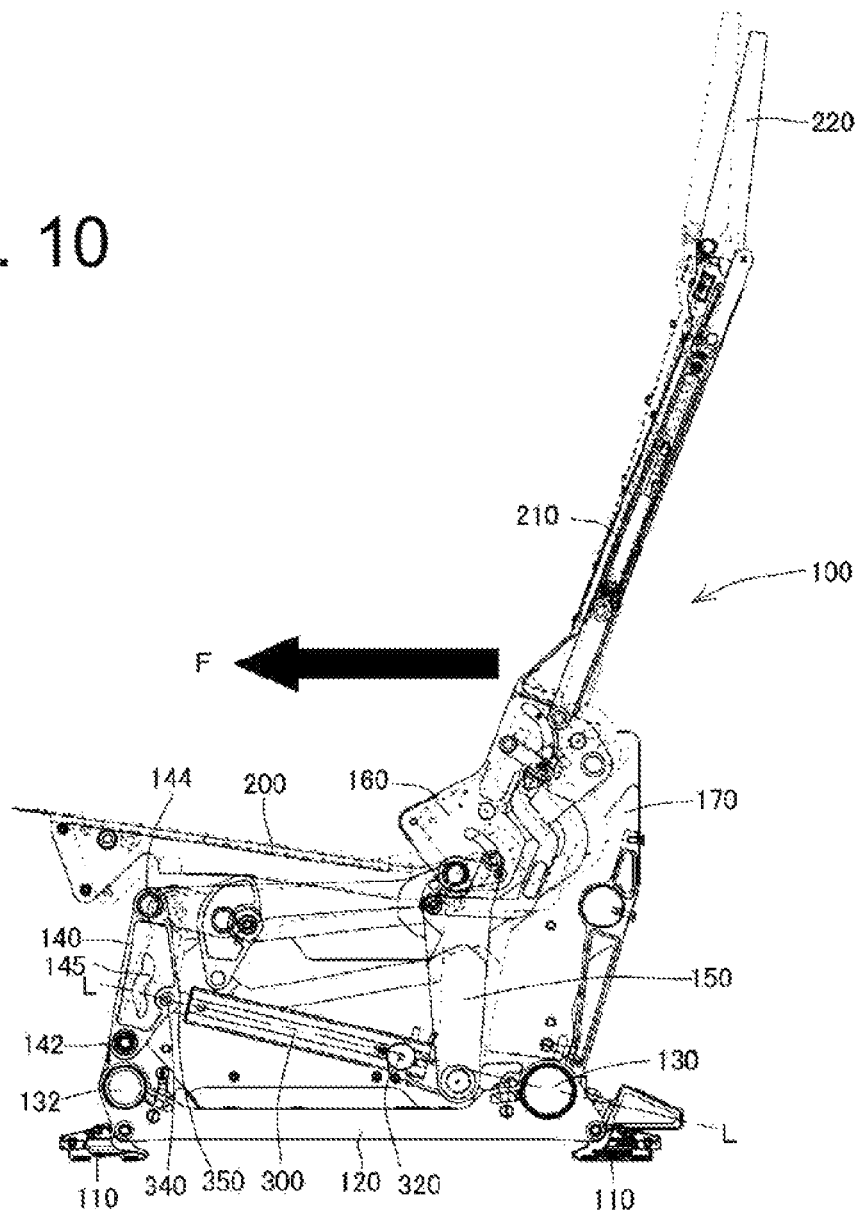
FIG. 10 is a side view of the aircraft passenger seat according to the present invention.

FIGS. 8, 9 and 10 illustrate an impact absorbing structure provided to the link plate 140 connected to the actuator 300.

As illustrated in FIG. 9, the link plate 140 adopts a configuration where two plate members face one another, and a groove, or slit, 145 is formed on both plate members. The grooves, or slits, 145 are provided at positions facing the pin 340 to which the rod 350 of the actuator 300 is connected.

As illustrated in FIG. 10, in a state where a large forward force F acts on the whole seat, the link plate 140 receives a pressing force in the forward direction. When this force is applied, the respective members are deformed from the positioned illustrated by dotted lines to the position illustrated by solid lines.

With this deformation, the grooves, or slits, 145 of the link plates 140 are widened, absorbing the impact.

Figure 11:
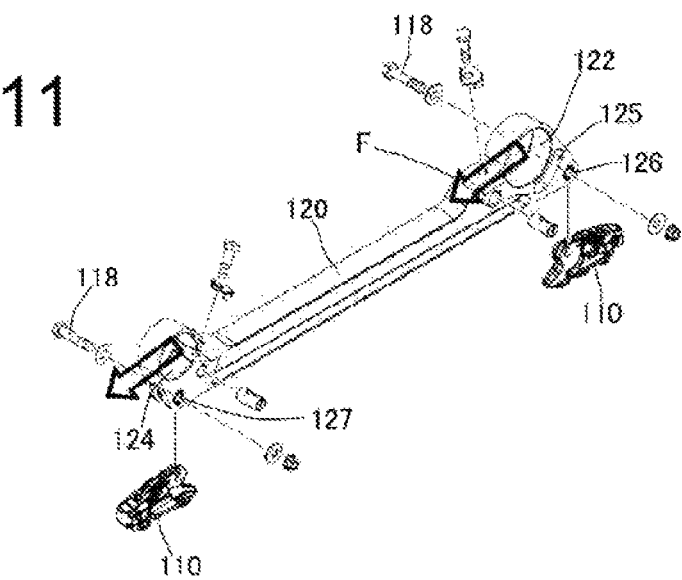
FIG. 11 is a perspective view of a member of the aircraft passenger seat according to the present invention.
Figure 12:
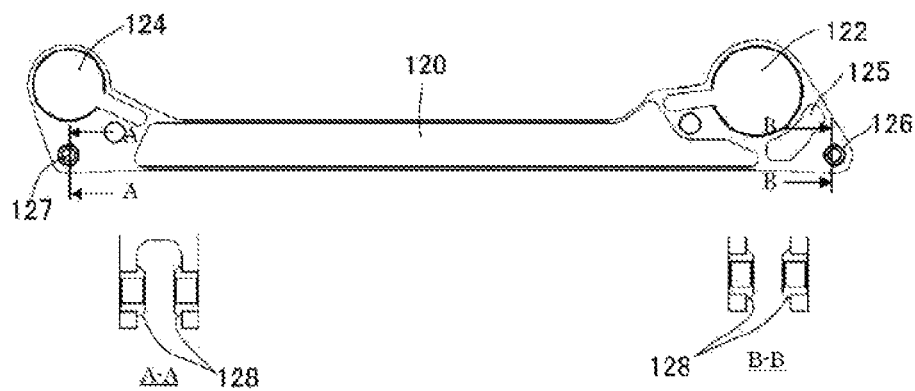
FIG. 12 is an explanatory view of a member of the aircraft passenger seat according to the present invention.
Figure 13:
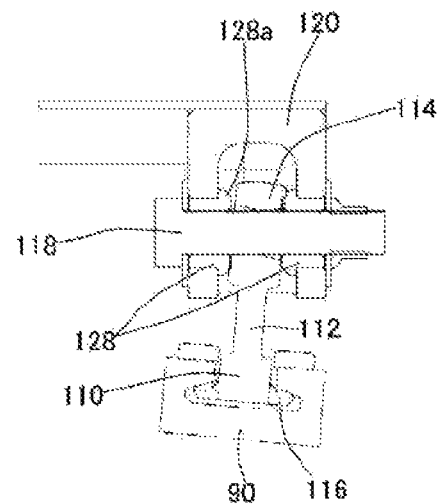
FIG. 13 is an explanatory view of a member of the aircraft passenger seat according to the present invention.

FIGS. 11, 12 and 13 illustrate an impact absorbing structure provided on fittings 110 and legs 120.

Each fitting 110 is configured so that a leg portion 116 and a head portion 114 are connected by a body portion 112.

The leg portion 116 is inserted to a seat track 90 fixed to a floor of the aircraft.

Each leg 120 has holes 122 and 124 through which the pipes are passed. Further, each leg 120 has bolt holes 126 and 127 receiving the head portion 114 of the fittings 110, and the fittings are fixed via bolts 118. Each leg 120 has a groove, or slit, 125 formed between a pipe hole 122 on a rear side and the bolt hole 126.

In a case where a forward force F acts on the leg 120, the groove, or slit, 125 deforms in an opening direction and absorbs the impact.

Further, bushings 128 are fit to the bolt holes 126 and 127.

When a force bringing down the fittings 110 is received, the bushings 128 deform and prevent bending stress from being transmitted to the legs 120.

In order to help this action, a tapered portion 128a is provided to an outer circumference of the respective bushings 128.

The aircraft passenger seat of the present invention having the above-described configuration enables to ensure the required strength without providing additional reinforcement members.

REFERENCE SIGNS LIST

100 Aircraft passenger seat
110 Seat track fitting
120 Leg
130 Pipe
132 Pipe
140 Link plate
145 Slit
150 Link plate
170 Spreader
172 Groove (slit)
200 Seat bottom frame
210 Back rest frame
220 Head rest frame
300 Actuator
320 Mount
350 Rod

The invention claimed is:
1. An aircraft passenger seat (3) comprising:
a pair of legs mounted via a fitting to a seat track on a floor surface of an aircraft;
two pipes fixed to a front portion and a rear portion of the legs;

a frame fixed to the two pipes and supporting a reclining assembly of the seat; and a linear actuator, wherein a rear portion of the linear actuator is supported pivotably on a mount fixed to one of the pipes located on the rear portion of the legs, and a tip of a linearly-moving rod of the linear actuator is coupled via a pin to a link plate operating the reclining assembly of the seat, and the linear actuator is arranged so that an axis line of the linear actuator passes a vicinity of a center of the one of the pipes; and wherein the mount comprises a pair of curved arms defining a through hole between the curved arms, and in a state where a force in a direction extending the mount is received, the curved arms are stretched to absorb an impact.

2. The aircraft passenger seat according to claim 1, wherein the link plate has a groove, and in a state where the reclining assembly of the seat receives a forward force, the groove deforms so as to be widened, and absorbs an impact.

3. The aircraft passenger seat according to claim 1, wherein the leg comprises a bolt hole provided at the rear portion fixed to the fitting, a pipe hole through which passes the one of the pipes, the pipe hole provided at a front portion of the bolt hole, and a groove formed between the bolt hole at the rear portion and the pipe hole, so that in a state where the leg receives a forward force, the groove deforms so as to be widened, and absorbs an impact.

4. The aircraft passenger seat according to claim 3, wherein the aircraft passenger seat comprises a bushing fit to an area between the bolt hole of the fitting and a bolt inserted to the bolt hole, and in a state where a force in the direction bringing down the fitting is applied, the bushing deforms and absorbs an impact.

5. The aircraft passenger seat accord to claim 4, wherein the bushing comprises a taper formed to an outer circumference portion of the bushing.

\* \* \* \* \*